US008503836B2

(12) United States Patent
Ishikawa et al.

(10) Patent No.: US 8,503,836 B2
(45) Date of Patent: Aug. 6, 2013

(54) WAVELENGTH DOMAIN OPTICAL SWITCH

(75) Inventors: Hiroshi Ishikawa, Tsukuba (JP); Toshifumi Hasama, Tsukuba (JP); Hitoshi Kawashima, Tsukuba (JP); Kenji Kintaka, Tsukuba (JP); Masahiko Mori, Tsukuba (JP); Hisato Uetsuka, Hitachi (JP); Hiroyuki Tsuda, Yokohama (JP); Keisuke Sorimoto, Yokohama (JP)

(73) Assignees: National Institute of Advanced Industrial Science and Technology, Tokyo (JP); Hitachi Cable, Ltd, Tokyo (JP); Keio University, Tokyo (JP)

( * ) Notice: Subject to any disclaimer, the term of this patent is extended or adjusted under 35 U.S.C. 154(b) by 372 days.

(21) Appl. No.: 13/014,151

(22) Filed: Jan. 26, 2011

(65) Prior Publication Data
US 2011/0182545 A1    Jul. 28, 2011

(30) Foreign Application Priority Data

Jan. 27, 2010  (JP) ................. 2010-015929

(51) Int. Cl.
*G02B 6/26* (2006.01)
*G02B 6/42* (2006.01)
*G02B 6/28* (2006.01)

(52) U.S. Cl.
USPC ................. 385/17; 385/18; 385/24

(58) Field of Classification Search
USPC .............................. 385/17, 18, 24
See application file for complete search history.

(56) References Cited

U.S. PATENT DOCUMENTS

| 7,088,882 B2 | 8/2006 | Ducellier et al. |
| 7,567,736 B2 * | 7/2009 | Ishikawa et al. ............... 385/15 |
| 2006/0067611 A1 | 3/2006 | Frisken et al. |

\* cited by examiner

*Primary Examiner* — Uyen Chau N Le
*Assistant Examiner* — Kajli Prince
(74) *Attorney, Agent, or Firm* — McCormick, Paulding & Huber LLP

(57) ABSTRACT

To provide a waveguide type wavelength domain optical switch which makes it possible to use a cheap lens, makes it possible to correct aberration of the demultiplexed wavelengths produced in a plurality of waveguide type demultiplexing circuits, a wavelength domain optical switch is provided with: an integrated element formed by laminating three or more waveguide type demultiplexing circuits; a first lens for collecting light emitted from the integrated element; a polarization separation element for separating light emitted from the first lens into X polarization and Y polarization and emitting the X polarization and the Y polarization at different angles; a second lens for collecting the X polarization and the Y polarization; a first reflective optical phase modulator for reflecting the collected X polarization and Y polarization at any angles; a ½-wavelength plate disposed between the second lens and the first reflective optical phase modulator in order to make polarization directions of the X polarization and the Y polarization identical; and a second reflective optical phase modulator for inputting light from the first reflective optical phase modulator into one of the waveguide type demultiplexing circuits.

8 Claims, 9 Drawing Sheets

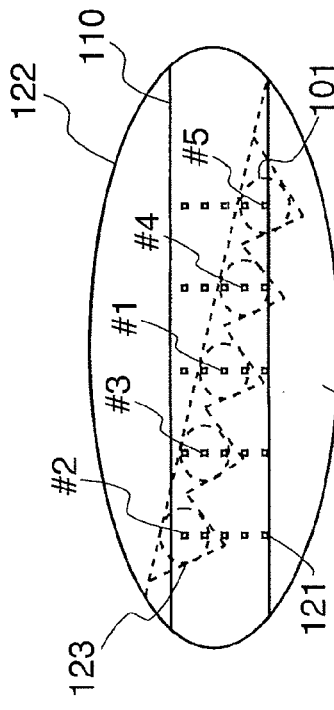
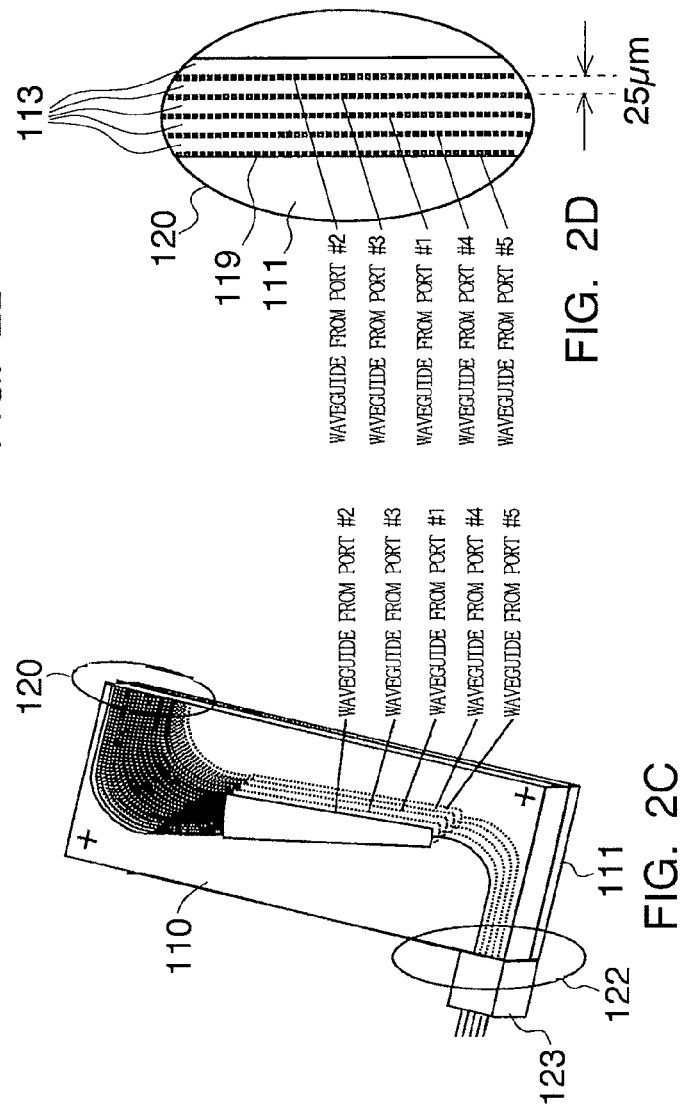
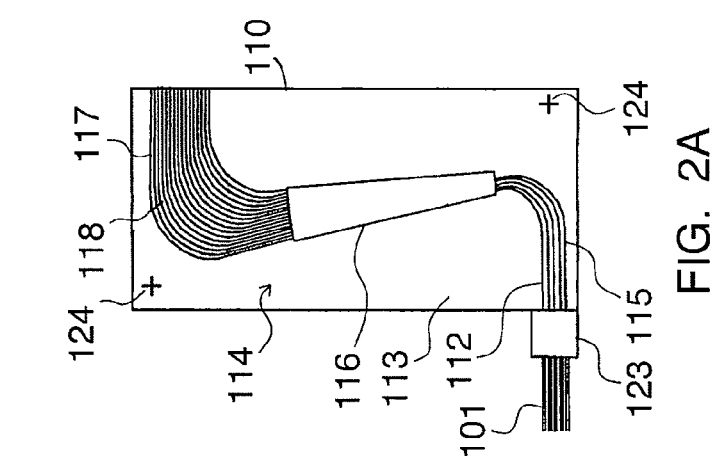
FIG. 2A
FIG. 2B
FIG. 2C
FIG. 2D

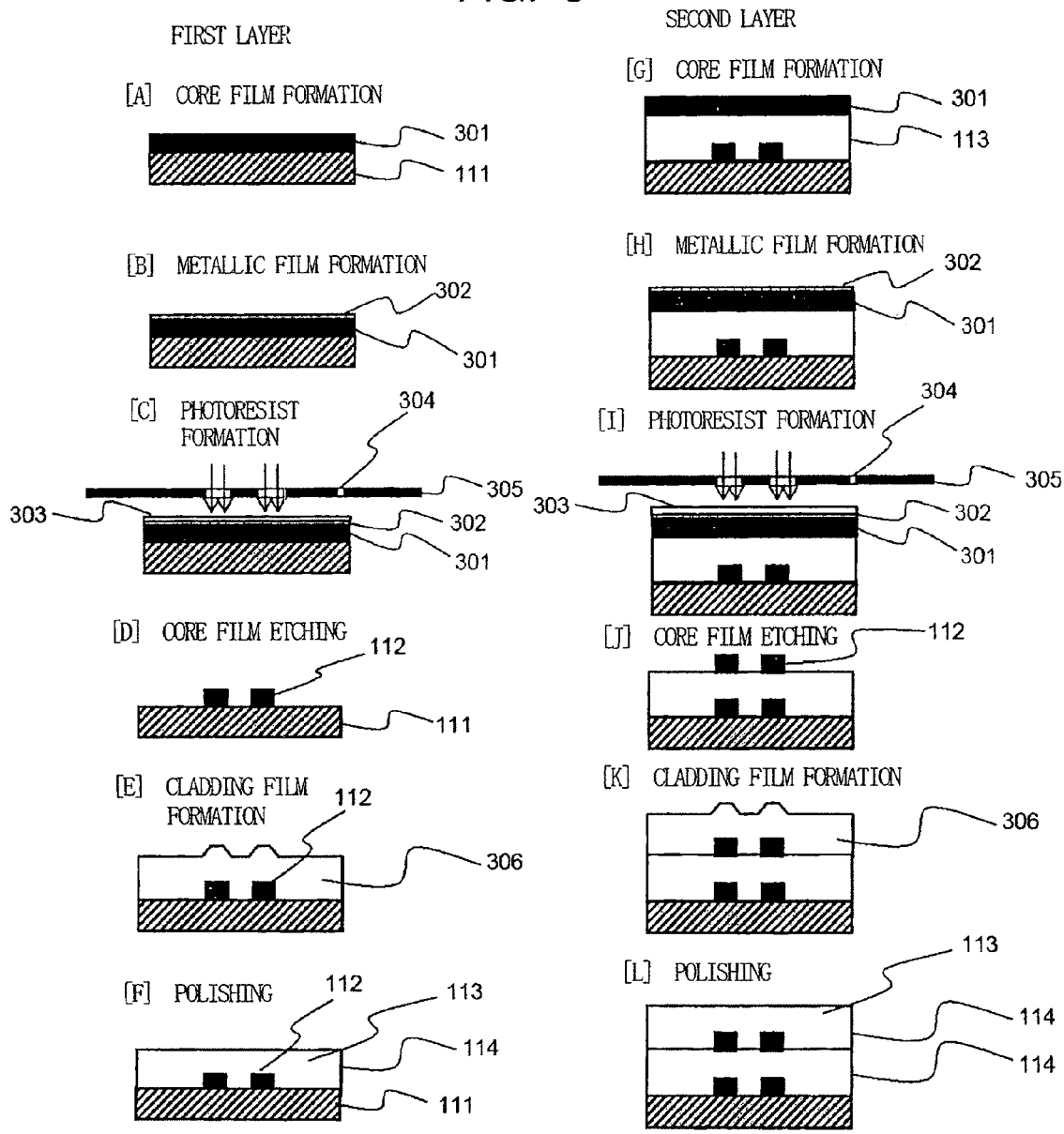

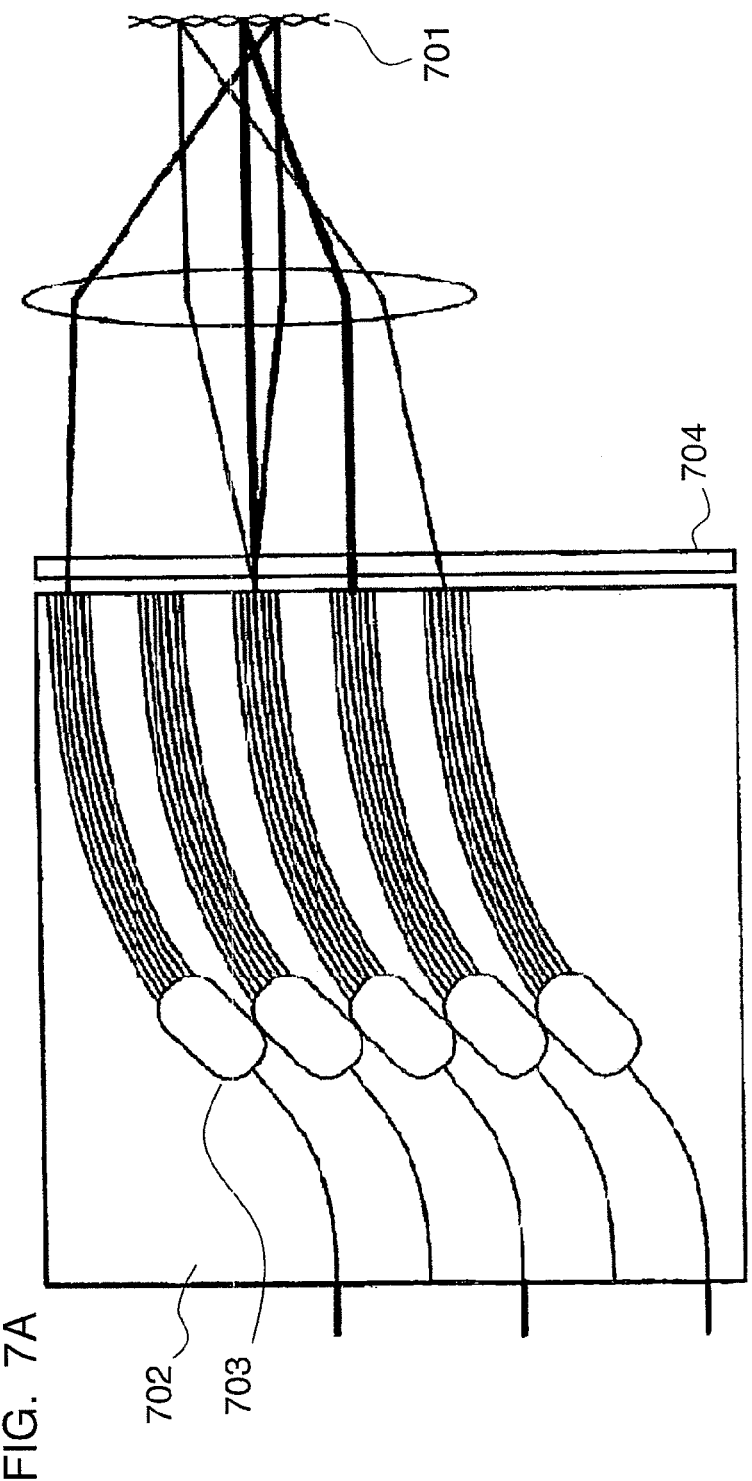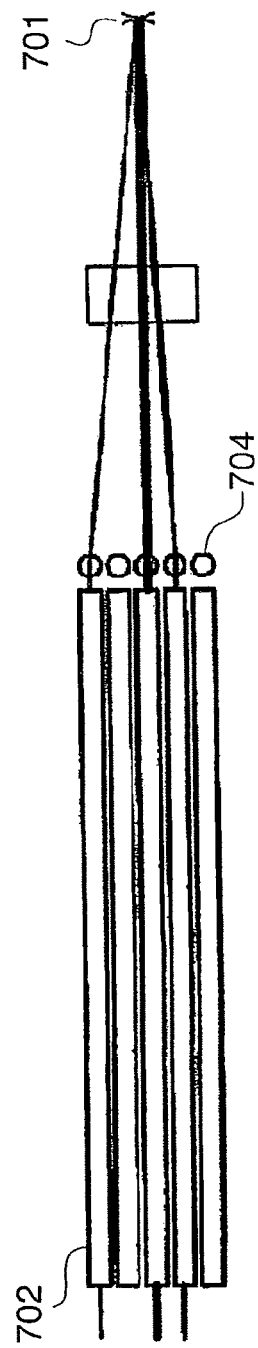
FIG. 7A
FIG. 7B

WAVELENGTH DOMAIN OPTICAL SWITCH

CROSS REFERENCE TO RELATED APPLICATIONS

Applicants hereby claim foreign priority benefits under U.S.C. §119 from Japanese Patent Application No. 2010-015929 filed on Jan. 27, 2010, the contents of which are incorporated by reference herein.

BACKGROUND OF THE INVENTION

1. Field of the Invention

The present invention relates to the wavelength domain optical switch which makes it possible to use a cheap lens, makes it possible to correct aberration of the demultiplexed wavelengths produced in a plurality of waveguide type demultiplexing circuits, and is no depending to polarization of incident light.

2. Description of the Related Art

As shown in FIG. 6, a wavelength domain optical switch 600 described in the specification of U.S. Patent Application Publication No. 2006/67611 is constituted by input/output optical fibers 601 to 606, a collimator lens array 610, a Wollaston prism 615 constituted by two triangular prisms 616, 617 for making a characteristic between horizontal polarized light (y polarization) and vertical polarized light (x polarization) independent, a birefringent plate 620 for setting a phase difference between the horizontal polarized light and the vertical polarized light at zero, a ½-wavelength plate unit 625 constituted by a ½-wavelength plate part 626 and a part 627 that does not affect the polarization, a concave mirror 630, a cylindrical lens 635, a grating 642 having an edge prism 641, a prism 646 for bending light vertically, and an LCOS SLM (Liquid Crystal On Si Spatial Light Modulator) 645.

Further, as shown in FIGS. 7A and 7B, a waveguide type wavelength selective switch described in the specification of U.S. Pat. No. 7,088,882 employs a MEMS (Micro Electro Mechanical System) micromirror 701. Here, five waveguide type demultiplexers 703 are disposed on a single substrate 702, and five further substrates 702 are stacked.

There is the following problem in the related art of FIG. 6.

(1) Since a bulk type grating 642 is used, and therefore a plurality of input beams is dispersed by the single grating 642. However, the dimensions of the bulk type grating 642 are large, making it difficult to achieve a reduction in size.

(2) The collimator lens array 610 is used for the respective input/output optical fibers 601 to 606, and since the collimator lens array 610 must be aligned with the input/output optical fibers 601 to 606 extremely strictly, a large amount of time is required for assembly. Furthermore, in order to suppress aberration, the collimator lens array 610 must be formed in an aspherical shape, leading to a large increase in cost.

(3) Since a complicated optical system is used, the price and assembly cost of the respective optical component increase. Hence, it is difficult to achieve a reduction in cost.

There is the following problem in the related art of FIG. 7.

(1) The plurality of waveguide type demultiplexers 703 is disposed in planar form on the single substrate 702. When the MEMS micromirror 701 is used, a large reflection angle is permitted, and therefore this structure is possible. However, when this structure is applied to a wavelength domain optical switch such as that of the present invention, the reflection angle of the LCOS SLM is small, and therefore the performance deteriorates dramatically. Further, to increase in the number of switchable ports in the related art, the plurality of substrates 702 (five in this example) on which the respective waveguide type demultiplexers 703 are disposed in planar form are laminated in a thickness direction, and a lens array 704 on which light converges in a vertical direction is provided for each substrate 702. However, the lens arrays 704 must be aligned with the respective waveguide demultiplexers 703 extremely strictly, leading to an increase in the amount of time required for assembly. Further, in order to suppress aberration, the lens array 704 must be formed in an aspherical shape, leading to a large increase in cost. These difficulties become gradually more insurmountable as the size of the lens array 704 is reduced, and it is therefore extremely difficult to achieve a size reduction.

(2) Spectral characteristics (demultiplexed wavelengths or center wavelengths) of the waveguide type demultiplexers 703 provided on the laminated substrates 702 must be strictly aligned such that deviation therebetween is no more than 1% of a demultiplexing interval, for example no more than 0.01 nm in the case of a 1 nm demultiplexing interval, and at current levels of microprocessing precision, it is extremely difficult to achieve this control. Accordingly, yield is extremely poor.

A common problem of the related art of FIGS. 6 and 7 is that the aberration required of the lens arrays is extremely exact, and therefore the lens arrays must be formed in an aspherical shape, leading to an increase in cost. Further, the lens arrays must be aligned with the optical fibers (or the waveguide type demultiplexers) extremely strictly, making mass production extremely difficult.

SUMMARY OF THE INVENTION

Therefore, the purpose of the present invention is to solve these subjects and to provide the wavelength domain optical switch which makes it possible to use a cheap lens, makes it possible to correct aberration of the demultiplexed wavelengths produced in a plurality of waveguide type demultiplexing circuits, and is no depending to polarization of incident light.

To achieve this object, the present invention is a wavelength domain optical switch including: an integrated element formed by laminating in a thickness direction three or more waveguide type demultiplexing circuits, each of which includes one or more input/output waveguides for inputting or outputting light, a slab waveguide connected to the input/output waveguide, and an array waveguide constituted by a plurality of waveguides connected to the slab waveguide such that entrance/exit ends of a plurality of waveguides are arranged in the thickness direction in relation to each array waveguide; a first lens having a focal length of F1, which is disposed at a distance F1 from the entrance/exit ends of the integrated element and collects light emitted from the entrance/exit ends; a polarization separation element which is disposed at the distance F1 from the first lens and separates the light emitted from the entrance/exit ends of the integrated element and passed through the first lens into mutually orthogonal X polarization and Y polarization, and emits the X polarization and the Y polarization; a second lens having a focal length F2, which is disposed at a distance F2 from the polarization separation element so as to face the polarization separation element and collects the X polarization and the Y polarization; a ½-wavelength plate which rotates only one of the X polarization and the Y polarization emitted from the second lens spatially by 90 degrees such that the X polarization and the Y polarization have identical polarization directions; a first reflective optical phase modulator which is disposed at the distance F2 from the second lens and reflects the polarization emitted from the second lens and passed through the ½-wavelength plate and the other polarization emitted from the second lens on the second lens; and a second reflective optical phase modulator which is disposed at the distance F2 from the second lens on an identical side to the polarization separation element so as to face the second lens, and inputs light reflected by the first reflective optical phase modulator into one of the waveguide type demultiplexing circuits.

An interval between the laminated waveguide type demultiplexing circuits of the integrated element may be within a range of 5 µm to 100 µm.

The first reflective optical phase modulator may be controlled to a refractive index distribution for correcting misalignment among demultiplexed wavelengths of the respective waveguide type demultiplexing circuits.

The first reflective optical phase modulator is controlled to a refractive index distribution obtained by superimposing a saw-shaped refractive index distribution for polarizing an input light beam in a desired direction, on a refractive index distribution for correcting aberration in the first lens and the second lens.

The present invention exhibits the following favorable effects.

(1) An inexpensive lens can be used.

(2) Deviation among the demultiplexed wavelengths of a plurality of waveguide type demultiplexing circuits can be corrected.

BRIEF DESCRIPTION OF THE DRAWINGS

FIG. 2 is a view illustrating the structure of the integrated element used in the present invention;

FIG. 2A is a plan view illustrating the structure of the integrated element used in the present invention;

FIG. 2B is an enlarged view showing a multiplexing side entrance/exit end surface in order to illustrate the structure of the integrated element used in the present invention;

FIG. 2C is a perspective view illustrating the structure of the integrated element used in the present invention;

FIG. 2D is an enlarged view showing a demultiplexing side entrance/exit end surface in order to illustrate the structure of the integrated element used in the present invention;

FIGS. 3A to 3L are schematic sectional views illustrating a manufacturing process sequence for manufacturing the integrated element used in the present invention;

FIG. 7A is a plan view of a conventional waveguide type wavelength selective switch;

FIG. 7B is a side view of the conventional waveguide type wavelength selective switch.

DESCRIPTION OF THE PREFERRED EMBODIMENTS

Figure 1A:
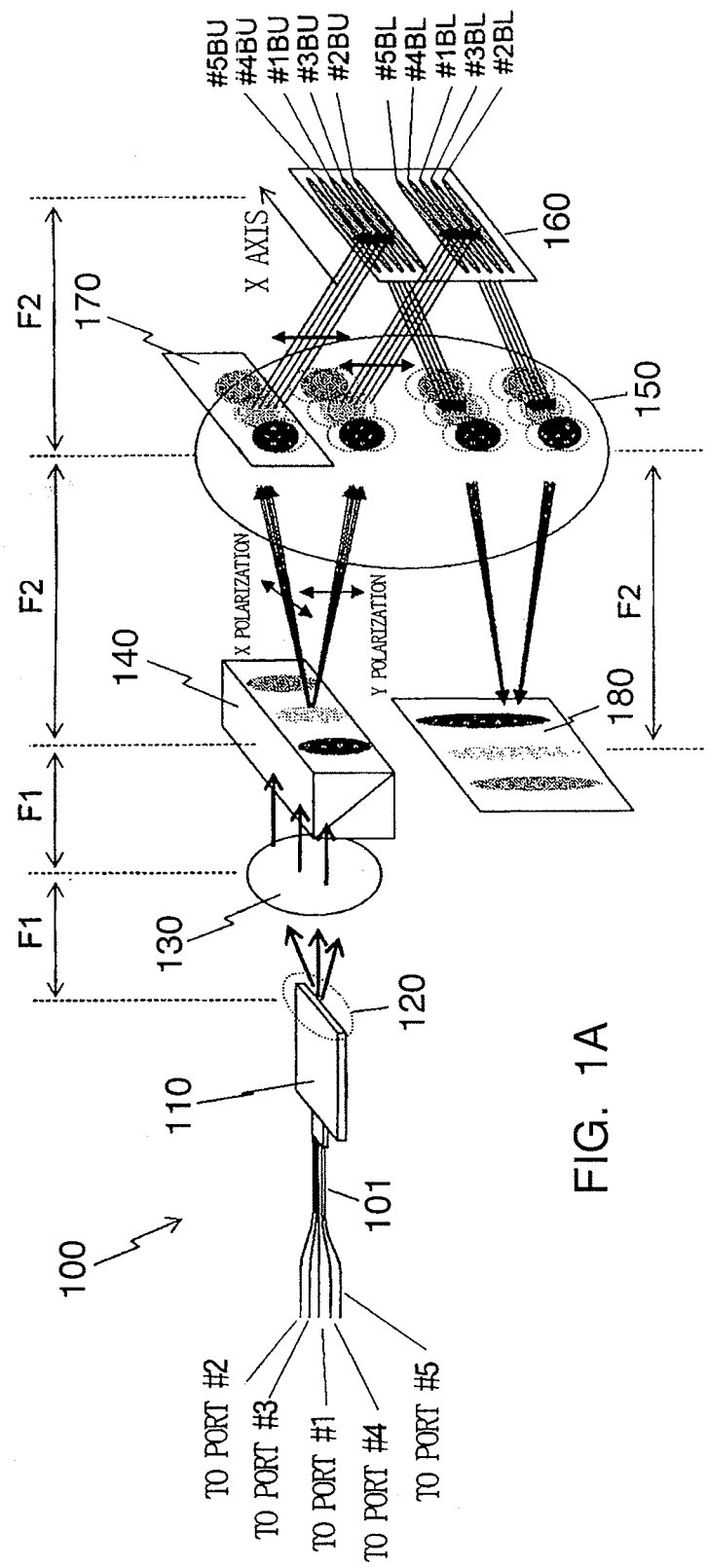
FIG. 1A is an overall perspective image view illustrating a structure of a wavelength domain optical switch according to an embodiment of the present invention.
Figure 1B:
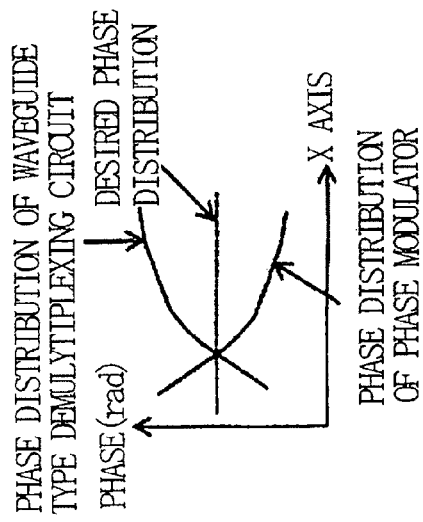
FIG. 1B is an enlarged view showing entrance/exit ends of an integrated element in order to illustrate the structure of the wavelength domain optical switch according to this embodiment of the present invention.
Figure 1C:
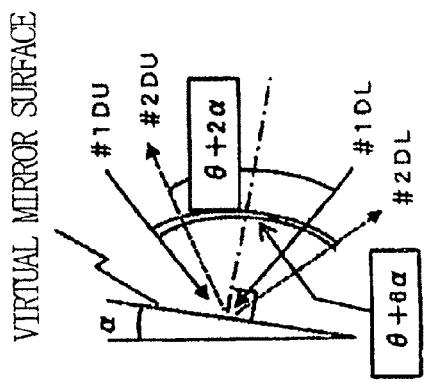
FIG. 1C is a view showing a phase distribution of a first reflective optical phase modulator in order to illustrate the structure of the wavelength domain optical switch according to this embodiment of the present invention.

An embodiment of the present invention will be described in detail below on the basis of the attached drawings.

As shown in FIGS. 1A to 1E, a wavelength domain optical switch 100 according to the present invention includes an integrated element 110, a first lens 130, a polarization separation element 140, a second lens 150, a first reflective optical phase modulator 160, a ½-wavelength plate 170, and a second reflective optical phase modulator 180.

The integrated element 110 includes five input/output ports #1 to #5 such that an input/output optical fiber 101 can be connected to each input/output port #1 to #5. Any of the input/output ports #1 to #5 may be used as an input port or an output port. In this embodiment, the wavelength domain optical switch 100 is a 1×4 optical switch having one input port and four output ports.

The structure of the integrated element 110 will now be described in further detail using FIGS. 2A to 2D.

The integrated element 110 is formed by laminating five waveguide type demultiplexing circuits 114, in which a core 112 having a high refractive index is buried in cladding 113 having a lower refractive index, onto a substrate 111. The waveguide type demultiplexing circuit 114 includes five input/output waveguides 115, a slab waveguide 116 that is connected to the input/output waveguides 115 and structured such that light is held therein in only a thickness direction, and an array waveguide 118 that is connected to the slab waveguide 116 and constituted by a plurality of waveguides 117 that differ in length sequentially by a fixed length.

The five waveguide type demultiplexing circuits 114 are laminated in close proximity in a thickness direction of the substrate 111 at intervals of 25 µm, for example. Here, the interval is a distance between an upper end of the core 112 in the waveguide type demultiplexing circuit 114 positioned on a lower side and a lower end of the core 112 in the waveguide type demultiplexing circuit 114 positioned on an upper side in FIG. 3L. The cladding 113 is interposed between overlapping cores 112. As a result, a demultiplexing side entrance/exit end surface 120 in which entrance/exit ends 119 of the respective waveguides 117 in the array waveguide 118 are arranged in the thickness direction of the substrate 111 (a lamination direction) is formed on one side of the integrated element 110, and a multiplexing side entrance/exit end surface 122 in which entrance/exit ends 121 of the plurality of input/output waveguides 115 on each layer are arranged in the thickness direction of the substrate 111 is formed on another side of the integrated element 110.

Hence, the integrated element 110 is formed by laminating the waveguide type demultiplexing circuits 114 in an integrated fashion on the single planar substrate 111. As shown in FIG. 2B, the entrance/exit ends 121 of five input/output waveguides 115 are arranged on each of the five layers of waveguide type demultiplexing circuits 114 on the multiplexing side entrance/exit end surface 122. The five optical fibers 101 are connected to the entrance/exit ends 121 to be used as the input/output ports #1 to #5. An optical fiber array 123 is formed by fitting the five optical fibers 101 into a plurality of parallel V grooves, and the optical fiber array 123 is attached to the multiplexing side entrance/exit end surface 122 at an incline relative to an upper surface of the integrated element 110.

It is known that when the input/output ports are varied in this type of waveguide type demultiplexing circuit, demultiplexed wavelengths also typically vary. In the present invention, however, the first reflective optical phase modulator 160 is used, and therefore the varied demultiplexed wavelengths are corrected. Note that alignment marks 124 are used in a manufacturing method to be described below to realize mask alignment when the respective waveguide type demultiplexing circuits 114 are laminated with a high degree of precision.

A method of manufacturing the integrated element 110 will now be described using FIGS. 3A to 3L. Note that in FIGS. 3A to 3L, the number of cores 112 in the waveguide type demultiplexing circuit 114 has been reduced to two.

As shown in FIG. 3A, to form the waveguide type demultiplexing circuit 114 of a first layer, first, a core glass 301 constituted by a core film is formed on the substrate 111, which is constituted by silica glass, using a method such as CVD (Chemical Vapor Deposition). A refractive index of the core glass 301 is set to be approximately 0.2 to 3% higher than that of the silica glass forming the substrate 111.

As shown in FIG. 3B, a metallic film 302 is formed on the core glass 301 using a sputtering method or the like in order to etch the core glass 301 into a shape having a rectangular cross-section.

As shown in FIG. 3C, a resist film 303 is then applied, whereupon photoresist is formed by exposing the resist film 303 through a photomask 305 having an alignment mark pattern 304. A resist pattern is then formed by developing the photoresist, whereupon the metallic film 302 is etched. By means of the alignment mark pattern 304, the waveguide type demultiplexing circuit 114 of the first layer and the alignment marks 124 (see FIG. 2A) can be formed simultaneously, and therefore the optical circuits of the subsequently formed second layer, third layer, and so on can be laminated with a high degree of precision.

As shown in FIG. 3D, the core glass 301 is then etched using the metallic film 302 as a mask such that the cores 112 of the waveguide type demultiplexing circuit 114 of the first layer and the alignment marks (not shown) remain on the substrate 111.

As shown in FIG. 3E, a cladding film 306 covering the cores 112 is formed by coating. The cladding film 306 is constituted by silica glass, and therefore the periphery of the cores 112 having a high refractive index is surrounded by silica glass having a low refractive index. An upper surface of the cladding film 306 is textured to correspond to the cores 112 having a rectangular cross-section.

As shown in FIG. 3F, the upper surface of the cladding film 306 is flattened using a polishing method such as CMP (Chemical Mechanical Polishing). As a result, the cladding 113 is formed.

As shown in FIGS. 3G to 3L, the waveguide type demultiplexing circuit 114 of the second layer is formed on the cladding 113 in a similar manner to the first layer. At this time, the alignment mark pattern 304 of the photomask 305 is positioned in alignment with the alignment marks of the first layer. The integrated element 110 in which the waveguide type demultiplexing circuits 114 are laminated integrally on a plurality of layers is then manufactured by repeating a similar process.

In contrast to a method of forming an integrated element by forming the waveguide type demultiplexing circuit 114 of the first layer on the substrate 111 and then laminating together similar components using an optical adhesive, the manufacturing method for the integrated element 110 described above does not require an optical adhesive, and therefore a corresponding increase in compactness can be achieved in the lamination direction, as shown in FIG. 3F.

Description will now return to the wavelength domain optical switch 100 shown in FIG. 1.

Figure 8:
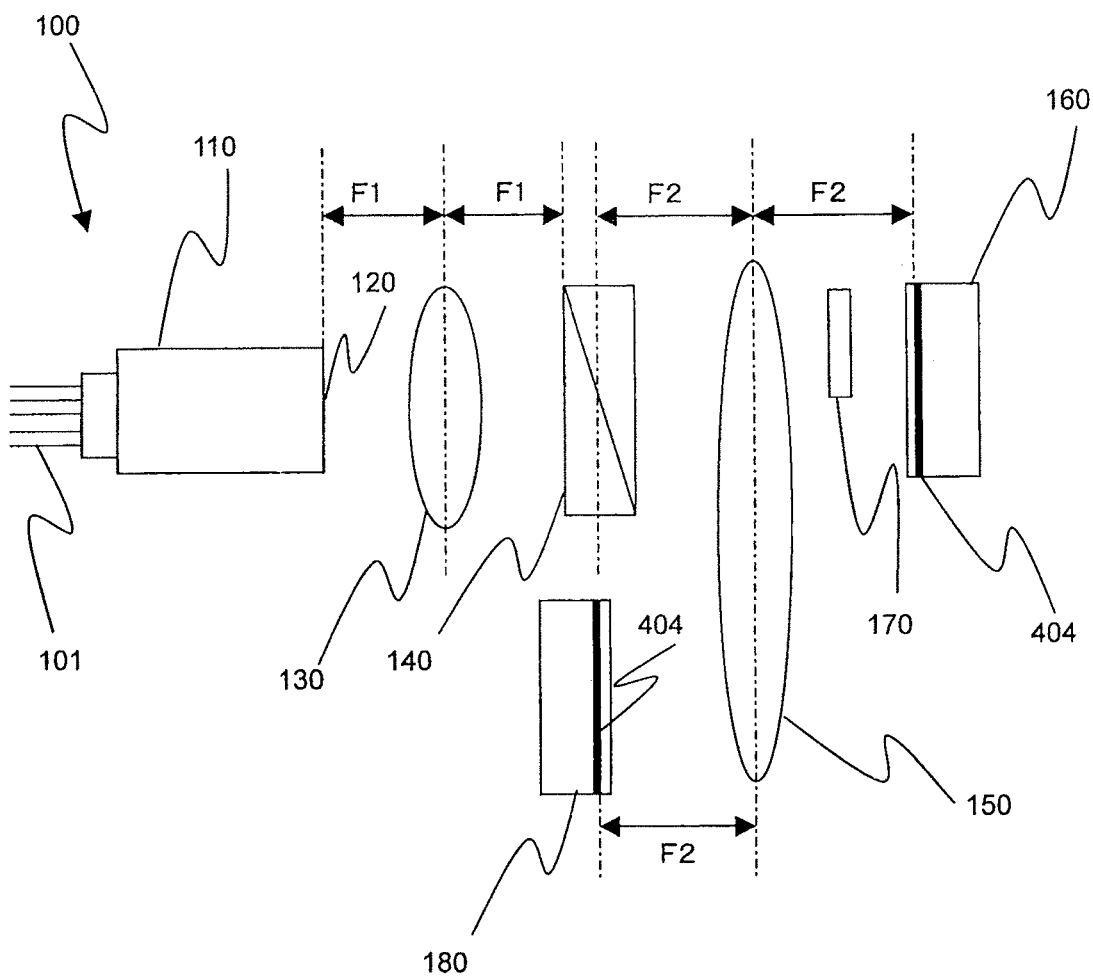
FIG. 8 is a side view showing positional relationships among respective members constituting the wavelength domain optical switch according to the present invention.

As shown in FIG. 1A and FIG. 8, a center of the first lens 130 is disposed at a distance F1 from the entrance/exit end 120 of the integrated element 110. The first lens 130 collects light emitted from the entrance/exit ends 119 of the waveguide type demultiplexing circuits 114 in the integrated element 110 and therefore functions to collimate light in the lamination direction and a width direction of the waveguide type demultiplexing circuits 114 in the integrated element 110. A spherical lens, a cylindrical lens, and so on may be used as the first lens 130. A focal length of the first lens 130 is F1 on both sides.

One end surface of the polarization separation element 140 positioned on the first lens 130 side is disposed at the distance F1 from the center of the first lens 130. The polarization separation element 140 is constituted by a Wollaston prism and is used to separate mutually orthogonal X polarization and Y polarization in the lamination direction of the integrated element 110.

A center of the second lens 150 is disposed at a distance F2 from a center of the polarization separation element 140 such that an upper half of the second lens 150 faces the polarization separation element 140. The second lens 150 collects both X polarization and Y polarization and therefore functions to collimate light in a parallel direction to the substrate 111 of the integrated element 110. A spherical lens, a cylindrical lens, and so on may be used as the second lens 150. A focal length of the second lens 150 is F2 on both sides.

In a normal LCOS SLM, a refractive index can only be varied in a uniaxial direction, and therefore only the phase of polarization in a uniaxial direction can be varied. For example, when only the refractive index in a Y axis direction can be varied, only the phase of Y polarization can be varied. However, light typically includes both X polarization and Y polarization components, and moreover, a ratio thereof varies over time. It is therefore necessary to subject the X polarization and the Y polarization to similar phase control. Accordingly, the ½-wavelength plate 170 is disposed between the second lens 150 and the first reflective optical phase modulator 160 on either an optical path of the X polarization or an optical path of the Y polarization so as to cover only one of the polarizations, and makes the polarization directions of the X polarization and the Y polarization the same by rotating one of the X polarization and the Y polarization emitted from the second lens 150 spatially by 90 degrees.

A reflective film 404 of the first reflective optical phase modulator 160 positioned on the second lens 150 side is disposed at the distance F2 from the center of the second lens 150. Note, however, that since the distance F2 is in the order of centimeters whereas respective films 403 to 408 constituting the first reflective optical phase modulator 160 are in the order of several microns, an end surface of the first reflective optical phase modulator 160 positioned on the second lens 150 side can be disposed at the distance F2 from the center of the second lens 150 with substantially no problems. The first reflective optical phase modulator 160 reflects the Y polarization collected by the second lens 150 and Y polarization obtained when the X polarization collected by the second lens 150 is converted by the ½-wavelength plate 170 at an arbitrary angle in each cell. The first reflective optical phase modulator 160 is constituted by a plurality of cells and has a variable refractive index in each cell. By controlling a refractive index distribution of the first reflective optical phase modulator 160 using a control circuit, not shown in the drawings, phase variation can be applied to reflection light in each cell.

The second reflective optical phase modulator 180, similarly to the first reflective optical phase modulator 160, is constituted by a plurality of cells and has a variable refractive index in each cell. By controlling a refractive index distribution of the second reflective optical phase modulator 180 using a control circuit, not shown in the drawings, phase variation can be applied to reflection light in each cell. The second reflective optical phase modulator 180 reflects light reflected by the first reflective optical phase modulator 160 and collimated by the second lens 150 at an arbitrary angle in each cell such that the reflected light enters one of the plurality of waveguide type demultiplexing circuits 114. The reflective film 404 of the second reflective optical phase modulator 180 positioned on the second lens 150 side is disposed at the distance F2 from the center of the second lens 150 on the same side as the polarization separation element 140 so as to face a lower half of the second lens 150. Note, however, that for the same reasons as the first reflective optical phase modulator 160, substantially no problems arise when an interval between an end surface of the second reflective optical phase modulator 180 positioned on the second lens 150 side and the center of the second lens 150 is set at the distance F2. Hence, the second reflective optical phase modulator 180 is disposed substantially parallel to the polarization separation element 140.

Identically constituted reflective optical phase modulators do not have to be used as the first reflective optical phase modulator 160 and the second reflective optical phase modulator 180, but it is assumed here for ease of description that identically constituted reflective optical phase modulators are used. This reflective optical phase modulator will now be described in detail using FIGS. 4A to 4E.

Figure 4A:
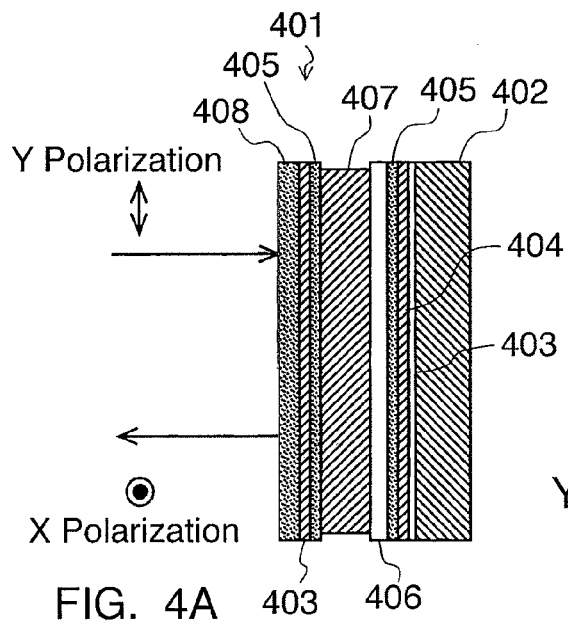
FIG. 4A is a sectional view illustrating the structure of and control of the reflective optical phase modulator used in the present invention.

As shown in FIG. 4A, a reflective optical phase modulator 401 is formed by laminating an electrode (an ITO, for example) 403, the reflective film 404, an $SiO_2$ film 405, an alignment film 406, a liquid crystal layer 407, the $SiO_2$ film 405, the electrode 403, and a thin film-form glass substrate 408 in sequence on an Si substrate 402 formed with an electronic circuit.

Figure 4B:
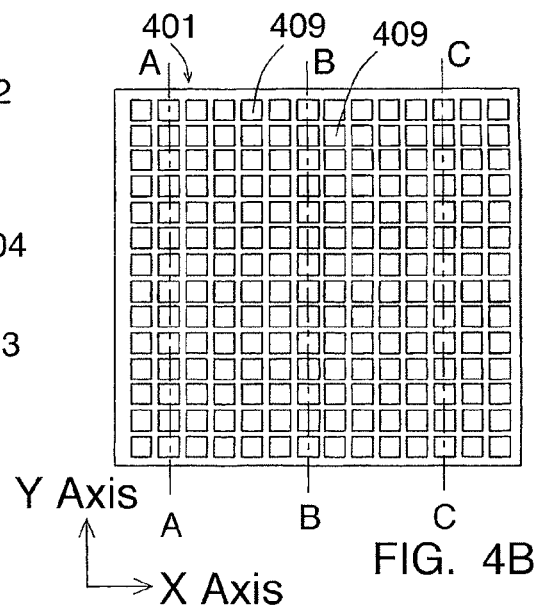
FIG. 4B is a front view illustrating the structure of and control of the reflective optical phase modulator used in the present invention.

As shown in FIG. 4B, the reflective optical phase modulator 401 includes a plurality of cells 409 arranged horizontally and vertically such that the refractive index of each cell 409 can be controlled independently. More specifically, by applying a voltage to each cell 409, an alignment direction (birefringence) of the liquid crystal layer 407 is controlled, and as a result, the phase of a light beam that enters and is reflected by an upper surface of the reflective optical phase modulator 401 can be modulated in each cell 409.

Figure 4C:
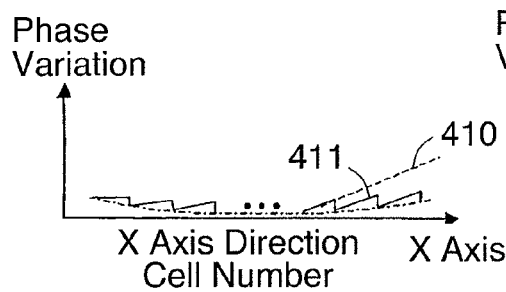
FIG. 4C is a graph showing phase variation distributions of optical phase modulation cells in an X axis direction in order to illustrate the structure of and control of the reflective optical phase modulator used in the present invention.

A phase variation required to reflect light beams entering the respective cells 409 of the reflective optical phase modulator 401 is at most approximately $2\pi$. Therefore, in the cells arranged in the X axis direction, as shown in FIG. 4C, the phase applied to the light beam does not exceed $2\pi$, and a phase distribution is set at a saw tooth-shaped phase distribution 411 that is equivalent to a linear phase distribution indicated in the drawing by a broken line 410.

Figure 4D:
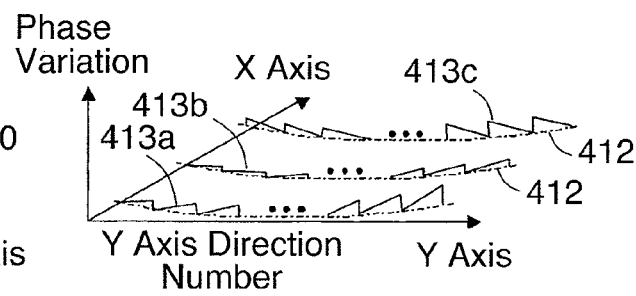
FIG. 4D is a graph showing the phase variation distributions of the optical phase modulation cells in order to illustrate the structure of and control of the reflective optical phase modulator used in the present invention.

Further, in locations removed from a central portion of a lens, it is typically impossible to collect light in an ideal manner, and as a result, aberration occurs. Therefore, a parabola-shaped phase distribution 412, as shown in FIG. 4D, is applied to the cells arranged in the Y axis direction by varying the voltages applied to the respective cells 409 of the reflective optical phase modulator 401, and as a result, a collection deviation caused by aberration between the first lens 130 and the second lens 150 can be corrected. By superimposing a similar saw tooth-shaped phase distribution to the X axis phase distribution 411 on the parabola-shaped phase distribution 412, phase distributions 413a, 413b, 413c are obtained.

FIG. 4D shows only the three phase distributions 413a, 413b, 413c in the X axis direction, but since these three distributions are located respectively on an A-A line, a B-B line and a C-C line of FIG. 4B, in actuality, phase variation in the entire reflective optical phase modulator 401 forms a two-dimensional distribution. The X axis direction positions are varied in accordance with the lamination positions of the waveguide type demultiplexing circuits 114 such that the distribution on the A-A line corresponds to the input/output port #2, for example, and the distribution on the B-B line corresponds to the input/output port #3, for example. The phase distributions 413a, 413b, 413c are formed by superimposing a saw tooth-shaped phase distribution on the parabola-shaped phase distribution 412, and the resulting phase distribution corrects a demultiplexing characteristic of the corresponding waveguide type demultiplexing circuit 114.

Figure 4E:
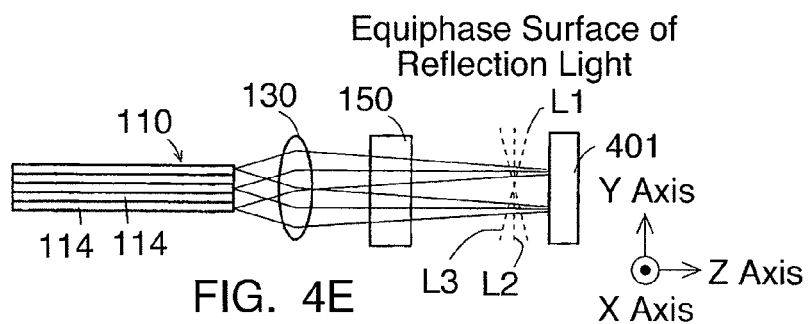
FIG. 4E is an optical path diagram showing an equiphase surface in order to illustrate the structure of and control of the reflective optical phase modulator used in the present invention.

By applying a refractive index distribution that brings about the phase distributions shown in FIG. 4D to the reflective optical phase modulator 401, the Y axis direction phases of light beams of each wavelength are varied such that the light beams exit the reflective optical phase modulator 401 at different angles. In other words, as shown in FIG. 4E, equiphase surfaces L1, L2, L3 of the light beams reflected by the reflective optical phase modulator 401 during spatial propagation are different at each wavelength. As a result, a light beam of a predetermined wavelength, from among the light beams emitted by the waveguide type demultiplexing circuit 114 having the input port, enters a desired waveguide type demultiplexing circuit 114 having an output port.

Note that the reflective optical phase modulator 401 used as the first reflective optical phase modulator 160 and the second reflective optical phase modulator 180 is preferably subjected to temperature control using a heater or a Peltier element so that a temperature thereof remains constant.

Next, functions and an optical signal transmission method of the wavelength domain optical switch 100 according to the present invention will be described.

When a beam (a wavelength multiplexed optical signal) of various wavelengths input from the optical fiber 101 enters the waveguide type demultiplexing circuit 114 directly in the middle of the integrated element 110 in the lamination direction, beams are emitted from the entrance/exit ends 119 of the respective waveguides 117 arranged on the multiplexing side entrance/exit end surface 120 in different directions for each wavelength. When these beams pass through the first lens 130, the beams of the respective wavelengths enter the polarization separation element 140 as mutually offset parallel beams. The beams that pass through the polarization separation element 140 are separated into two groups, namely an X polarization group and a Y polarization group, whereupon the respective groups enter the upper half of the second lens 150. Having passed through the second lens 150, the two polarization groups (the X polarization group and the Y polarization group) respectively form parallel beams that enter the first reflective optical phase modulator 160. At this time, the X polarization group forming one of the two separated polarization groups passes through the ½-wavelength plate 170 before entering the first reflective optical phase modulator 160. In the ½-wavelength plate 170, the polarization direction of the X polarization group is rotated 90° spatially to become Y polarization, whereupon the Y polarization enters the first reflective optical phase modulator 160.

The reason for having the X polarization group pass through the ½-wavelength plate 170 but having the Y polarization group enter the first reflective optical phase modulator 160 without passing through the ½-wavelength plate 170 is to ensure that the reflective optical phase modulator 401 acts on (controls the reflection light direction of) only one type of polarization (here, the Y polarization). In a case where the reflective optical phase modulator 401 is to be applied only to the X polarization, the Y polarization should be passed through the ½-wavelength plate 170.

A case in which light enters all of the input/output ports #1 to #5 of the integrated element 110 will now be considered. Beams are emitted from the respective entrance/exit ends 119 of the multiplexing side entrance/exit end surface 120 in different directions for each wavelength, and therefore images #1BU to #5BU generated by five beams of the X polarization group that is separated by the polarization separation element 140 and spatially rotated 90° by the ½-wavelength plate 170 are projected onto the upper half of the first reflective optical phase modulator 160. Meanwhile, images #1BL to #5BL generated by five beams of the Y polarization group separated by the polarization separation element 140 are projected onto the lower half of the first reflective optical phase modulator 160.

The images #1BU to #5BU, #1BL to #5BL generated by the total of ten beams are analogous to the distribution of the beams emitted from the respective waveguide type demultiplexing circuits 114 of the integrated element 110 but disposed upside-down. The reason why the images formed by the beams are analogous to the beam distribution is that the images formed by the beams are subjected to Fourier transform twice by the first lens 130 and the second lens 150. A magnification ratio B of the images formed by the beams and the beam distribution is given by $B=F_2/F_1$. Hence, the phase distribution of the beam distribution projected onto the first reflective optical phase modulator 160 is identical to that of the respective waveguide type demultiplexing circuits 114. Therefore, since the phase distribution of the liquid crystal cells in the parts, onto which the respective beams are projected, is changed to a complementary distribution, the center wavelength, which varied previously among the respective beams, is corrected. This will be explained below using FIG. 1C.

The beam image #1BU and the beam image #1BL, for example, are converted images obtained by converting the beam distribution emitted from the waveguide type demultiplexing circuit 114 corresponding to the port #1, and therefore collecting positions thereof are different whereas amplitudes and phases thereof are identical. As shown in the drawing, the phase distribution of the waveguide type demultiplexing circuit 114 deviates from a desired phase distribution (broken line) due to manufacturing process variation. By applying a phase distribution that has been inverted relative to this phase distribution to the first reflective optical phase modulator 160, the resulting phase distribution can be substantially aligned with the desired phase distribution, and therefore the varying phase distributions of the respective waveguide type demultiplexing circuits 114 can be corrected to substantially perfectly aligned phase distributions. In other words, the demultiplexed wavelengths (determined by the incline of the phase distribution) of the five waveguide type demultiplexing circuits 114 can be corrected so as to match each other.

A beam reflected by the first reflective optical phase modulator 160 passes through the lower half of the second lens 150 and is projected onto the second reflective optical phase modulator 180. Here, an image formed by the projected beam is a Fourier-transformed image of the beam distribution from the first reflective optical phase modulator 160 (which is analogous to the beam distributions from the respective waveguide type demultiplexing circuits 114 of the integrated element 110), and therefore, if the image formed by the beam projected onto the first reflective optical phase modulator 160 has an elliptical Gauss distribution in which the X axis is the long axis, the image formed by the beam projected onto the second reflective optical phase modulator 180 has an elliptical distribution rotated 90° such that the Y axis is the long axis. As a result, beams of respective wavelengths are projected onto locations corresponding to respective wavelengths on the Y axis. The first reflective optical phase modulator 160 performs phase correction such that the demultiplexed wavelengths of the respective waveguide type demultiplexing circuits 114 all match, and therefore the total of ten beam distributions (including polarization) relating to the respective wavelengths form a single beam distribution that is projected onto the second reflective optical phase modulator 180.

Figure 1D:
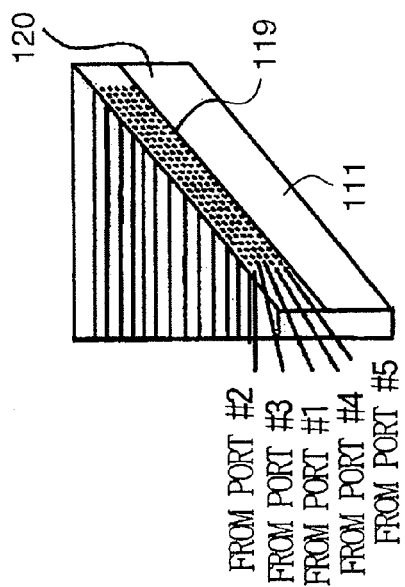
FIG. 1D is a view showing an optical path of input light through a second reflective optical phase modulator in order to illustrate the structure of the wavelength domain optical switch according to this embodiment of the present invention.

FIG. 1D shows the manner in which the ten beams enter the second reflective optical phase modulator 180. One of the two polarization groups separated by the polarization separation element 140 (light beams #1DU to #5DU corresponding to the beam images #1BU to #5BU) enters the second reflective optical phase modulator 180 in a downwardly oriented diagonal direction, while the other polarization group (light beams #1DL to #5DL corresponding to the beam images #1BL to #5BL) enters the second reflective optical phase modulator 180 in an upwardly oriented diagonal direction. In the respective polarization groups, entrance angle differences between the respective light beams are determined in accordance with the lamination intervals between the respective waveguide type demultiplexing circuits 114 such that if the waveguide type demultiplexing circuits 114 are laminated at equal intervals, the entrance angle differences take an identical angle α. As shown in FIG. 1D, an angle between the two separated polarization groups is set at θ.

Figure 1E:
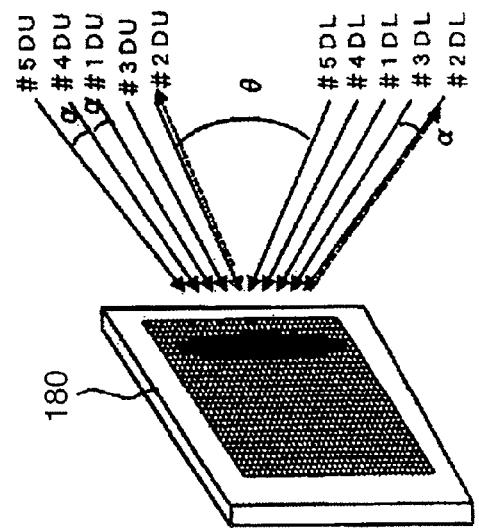
FIG. 1E is an optical path diagram illustrating reflection angle control in the second reflective optical phase modulator in order to illustrate the structure of the wavelength domain optical switch according to this embodiment of the present invention.

The second reflective optical phase modulator 180 is constituted by a plurality of liquid crystal cells, and by varying the refractive indices of the respective cells, a virtual mirror is realized. As shown in FIG. 1E, when an angle φ of a mirror surface of this virtual mirror is inclined downward by the angle α from a vertical plane (when φ=α), the light beam (#1DL) is reflected at an angle of the light beam (#2DU), and the light beam (#1DU) is reflected as the light beam (#2DL). In other words, the light beams (#1DL, #1DU) indicated by solid lines in FIG. 1E are switched to the light beams (#2DU, #2DL) indicated by broken lines.

Description will now return to the method of transmitting an optical signal employed in the wavelength domain optical switch 100. Here, the wavelength domain optical switch 100 is a 1×4 optical switch in which the central input/output port #1 is used as the input port and the remaining input/output ports #2 to #5 are used as the output ports. The following description will focus on a single wavelength demultiplexed by the waveguide type demultiplexing circuit 114.

A beam input into the central input/output port #1 serving as the input port from the optical fiber 101 is demultiplexed by the waveguide type demultiplexing circuit 114. A beam of a single wavelength, from the demultiplexed beam, passes through the first lens 130 and is then separated into two by the polarization separation element 140. One of the two beams passes through the second lens 150 and the ½-wavelength plate 170 while the other passes through the second lens 150 alone. Thus, the two beams are formed into identical polarization that is projected onto the first reflective optical phase modulator 160 (as the beam images #1BU, #1BL). The two projected beams are reflected after undergoing phase correction, thereby passing back through the second lens 150 so as to enter the second reflective optical phase modulator 180 at different angles (as the light beams #1DU, #1DL). The two light beams are projected onto the second reflective optical phase modulator 180 as a single beam distribution.

Here, as shown in FIG. 1E, by applying an appropriately inclined phase distribution to the second reflective optical phase modulator 180, the light beam #1DL, for example, is reflected as the light beam #2DU, whereupon the light beam #2DU travels back along the optical path shown in FIG. 1. More specifically, the beam that is reflected as the light beam #2DU forms the beam image #2BU on the first reflective optical phase modulator 160 and is then reflected thereby.

The beam that is reflected as the beam image #2BU is subjected to 90° polarization rotation by the ½-wavelength plate 170 and then passes through the second lens 150 and the polarization separation element 140 so as to enter the waveguide type demultiplexing circuit 114 connected to the input/output port #2. The beam is then output from the input/output port #2.

Meanwhile, in the second reflective optical phase modulator 180, the light beam #1DU is reflected as the light beam #2DL, whereupon the light beam #2DL travels back along the optical path shown in FIG. 1. More specifically, the beam that is reflected as the light beam #2DL forms the beam image #2BL on the first reflective optical phase modulator 160 and is then reflected thereby.

The beam that is reflected as the beam image #2BL then passes through the second lens 150 and the polarization separation element 140 so as to enter the waveguide type demultiplexing circuit 114 connected to the input/output port #2. The beam is then output from the input/output port #2.

A switching operation in which both the X polarization and the Y polarization of a beam input into the input/output port #1 are emitted from the input/output port #2 is thus completed. Thus, switching can be performed independently of the input polarization.

A switching operation from the input/output port #1 to the input/output port #2 was described above, but by varying the phase distribution incline applied to the second reflective optical phase modulator 180, switching can also be performed from the input/output port #1 to the input/output ports #3, #4, #5.

More specifically, when the angle of the virtual mirror surface is φ, the entrance angle difference between the respective light beams is α, and the angle between the polarization groups is θ, the following effects are obtained.

When φ=0, the light beam #1DU is reflected at an angle θ+4α to become the light beam #1DL and the light beam #1DL is reflected at an angle θ+4α to become the light beam #1DU. Therefore, the beam output from the input/output port #1 returns to the input/output port #1. This corresponds to a case in which switching is not performed.

When φ=α/2, the light beam #1DU is reflected at an angle θ+5α to become the light beam #3DL and the light beam #1DL is reflected at an angle θ+3α to become the light beam #3DU. Therefore, the beam output from the input/output port #1 returns to the input/output port #3. In other words, switching is performed from the input/output port #1 to the input/output port #3.

When φ=α, as described above, the light beam #1DU is reflected at an angle θ+6α to become the light beam #2DL and the light beam #1DL is reflected at an angle θ+2α to become the light beam #2DU. Therefore, the beam output from the input/output port #1 returns to the input/output port #2. In other words, switching is performed from the input/output port #1 to the input/output port #2.

When φ=−α/2, the light beam #1DU is reflected at an angle θ+3α to become the light beam #4DL and the light beam #1DL is reflected at an angle θ+5α to become the light beam #4DU. Therefore, the beam output from the input/output port #1 returns to the input/output port #4. In other words, switching is performed from the input/output port #1 to the input/output port #4.

When φ=−α, the light beam #1DU is reflected at an angle θ+2α to become the light beam #5DL and the light beam #1DL is reflected at an angle θ+6α to become the light beam #5DU. Therefore, the beam output from the input/output port #1 returns to the input/output port #5. In other words, switching is performed from the input/output port #1 to the input/output port #5.

Further, beams of a large number of wavelengths are projected onto the second reflective optical phase modulator 180, and therefore, by subjecting cell groups in regions of the respective projected wavelengths to phase distribution control independently, the beams of the respective wavelengths can be switched independently.

As described above, according to the present invention, an expensive aspherical lens array that was problematic in the related art is not used to collect light from the plurality of laminated waveguide type demultiplexing circuits 114, and instead, the single inexpensive first lens 130 is used. As a result, a reduction in cost is achieved. This reduction in cost is made possible by employing the integrated element 110 in which the laminated waveguide type demultiplexing circuits 114 are laminated at extremely narrow intervals of 5 μm to 100 μm to form an integrated body. This lamination interval can only be realized through a similar microprocessing technique to that used for a semiconductor LSI, such as photolithography or dry etching. Conventionally, when a plurality of optical fiber arrays are overlapped, the lamination interval is several hundred μm, and therefore, when a plurality of waveguides are adhered to each other, the waveguide interval reaches several thousand μm. In such a case, a lens array must be used to limit the device to practicable dimensions.

Further, in the integrated element 110 manufactured using a similar microprocessing technique to that of an LSI, it is important to align the demultiplexed wavelengths (center wavelengths) of the respective laminated waveguide type demultiplexing circuits 114 strictly (to a demultiplexing interval of no more than 1%) because when the demultiplexed wavelengths are not aligned, extremely large loss occurs. With a conventional microprocessing technique, it is extremely difficult to align the demultiplexed wavelengths strictly, and therefore, in order to align the demultiplexed wavelengths strictly, the demultiplexed wavelengths must be corrected using a certain method after the integrated element 110 is manufactured. In the present invention, the first reflective optical phase modulator 160 is used to perform wave surface correction such that beams emitted from the respective laminated waveguide type demultiplexing circuits 114 have identical demultiplexed wavelengths. With this technique it has become possible for the first time to use an integrated element 110 manufactured through a microprocessing technique.

According to the present invention, an inexpensive, small, high-performance, flexible wavelength domain optical switch can be realized, enabling great advancements in optical systems and optical networks of the future.

Next, other embodiments of the present invention will be described.

The light emitted from the waveguide type demultiplexing circuit 114 has an elliptical beam distribution, and therefore, when an ellipticity thereof is large, a semi-cylindrical lens may be used as the first lens 130. Alternatively, semi-cylindrical lenses may be combined.

In the wavelength domain optical switch 100 shown in FIG. 1A, two three-dimensional lenses (the first lens 130 and the second lens 150) are used, but the respective lenses may be realized by combining semi-cylindrical two-dimensional lenses.

Furthermore, inexpensive lenses are more likely to include aberration. Therefore, lens aberration is preferably corrected by providing each cell of the second reflective optical phase modulator 180 with an aberration-correcting phase distribution, as in the embodiment described above.

In the embodiment described above, the waveguide type demultiplexing circuits 114 are laminated on five layers in the integrated element 110, but by laminating three layers, an optical switch having one input and two outputs can be formed, and by laminating three or more layers, an optical switch having one input and two or more outputs can be formed.

Figure 5:
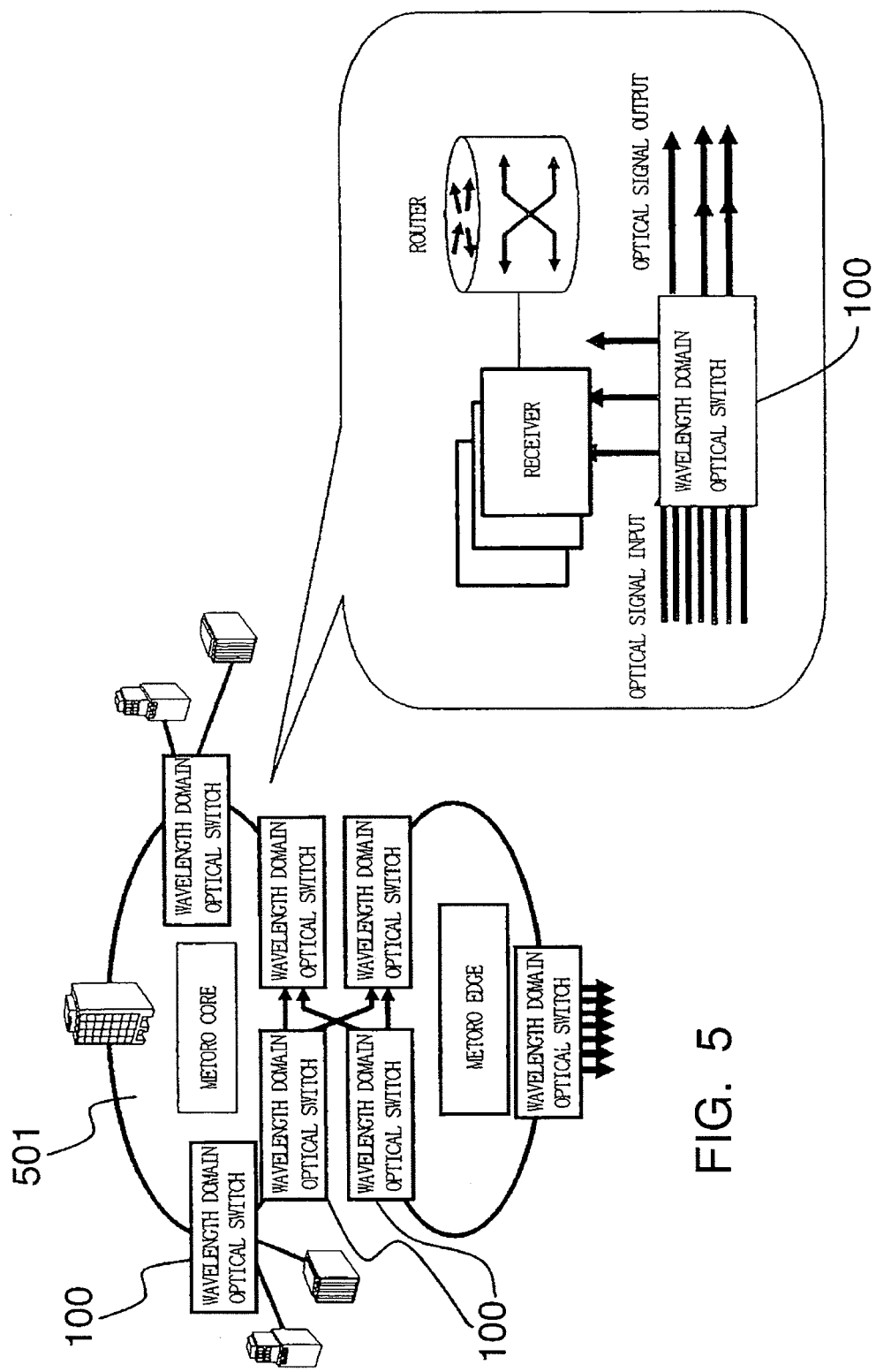
FIG. 5 is a constitutional diagram showing a communication system employing the wavelength domain optical switch according to the present invention
Figure 6:
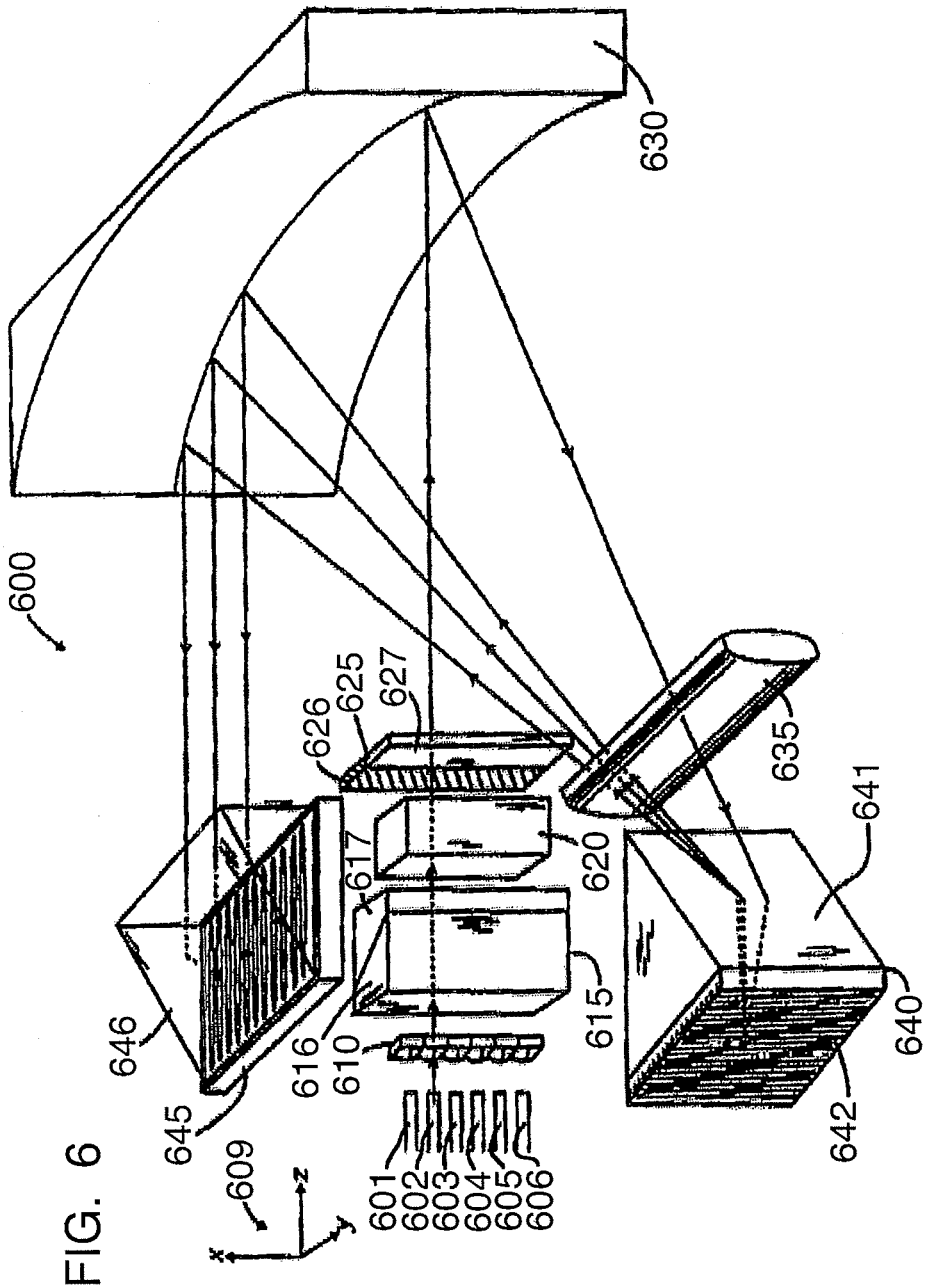
FIG. 6 is a perspective image view of a conventional wavelength domain optical switch.

Next, a method of using the wavelength domain optical switch 100 according to the present invention will be described. As shown in FIG. 5, the wavelength domain optical switch 100 may be used in each node of a metro core 501, and may also be applied to a normal optical signal splitting/inserting (an optical Add/Drop) system or an optical cross-connect system. Note that a conventional wavelength domain optical switch is used in a comparatively large-scale system such as a main line system or a metro core, but since a large cost reduction can be achieved with the present invention, the wavelength domain optical switch can be introduced into a wide range of systems such as a metro edge and an access system, thereby enabling groundbreaking developments in the field of optical networks.

While the present invention has been illustrated and described with respect to a particular embodiment thereof, it should be appreciated by those of ordinary skill in the art that various modifications to this invention may be made without departing from the spirit and scope of the present.

What is claimed is:

1. A wavelength domain optical switch comprising:
    an integrated element formed by laminating in a thickness direction three or more waveguide type demultiplexing circuits, each of which includes one or more input/output waveguides for inputting or outputting light, a slab waveguide connected to the input/output waveguide, and an array waveguide constituted by a plurality of waveguides connected to the slab waveguide such that entrance/exit ends of a plurality of waveguides are arranged in the thickness direction in relation to each array waveguide;
    a first lens having a focal length of F1 which is disposed at a distance F1 from the entrance/exit ends of the integrated element and collects light emitted from the entrance/exit ends;
    a polarization separation element which is disposed at the distance F1 from the first lens and separates the light emitted from the entrance/exit ends of the integrated element and passed through the first lens into mutually orthogonal X polarization and Y polarization, and emits the X polarization and the Y polarization;
    a second lens having a focal length F2, which is disposed at a distance F2 from the polarization separation element so as to face the polarization separation element and collects the X polarization and the Y polarization;
    a ½-wavelength plate which rotates only one of the X polarization and the Y polarization emitted from the second lens spatially by 90 degrees such that the X polarization and the Y polarization have identical polarization directions;
    a first reflective optical phase modulator which is disposed at the distance F2 from the second lens and reflects the polarization emitted from the second lens and passed through the ½-wavelength plate and the other polarization emitted from the second lens on the second lens; and
    a second reflective optical phase modulator which is disposed at the distance F2 from the second lens on an identical side to the polarization separation element so as to face the second lens, and inputs light reflected by the first reflective optical phase modulator into one of the waveguide type demultiplexing circuits.

2. The wavelength domain optical switch according to claim 1, wherein an interval between the laminated waveguide type demultiplexing circuits of the integrated element is within a range of 5 μm to 100 μm.

3. The wavelength domain optical switch according to claim 1, wherein the first reflective optical phase modulator is controlled to a refractive index distribution for correcting misalignment among demultiplexed wavelengths of the respective waveguide type demultiplexing circuits.

4. The wavelength domain optical switch according to claim 2, wherein the first reflective optical phase modulator is controlled to a refractive index distribution for correcting misalignment among demultiplexed wavelengths of the respective waveguide type demultiplexing circuits.

5. The wavelength domain optical switch according to claim 1, wherein the first reflective optical phase modulator is controlled to a refractive index distribution obtained by superimposing a saw-shaped refractive index distribution for polarizing an input light beam in a desired direction, on a refractive index distribution for correcting aberration in the first lens and the second lens.

6. The wavelength domain optical switch according to claim 2, wherein the first reflective optical phase modulator is controlled to a refractive index distribution obtained by superimposing a saw-shaped refractive index distribution for polarizing an input light beam in a desired direction, on a refractive index distribution for correcting aberration in the first lens and the second lens.

7. The wavelength domain optical switch according to claim 3, wherein the first reflective optical phase modulator is controlled to a refractive index distribution obtained by superimposing a saw-shaped refractive index distribution for polarizing an input light beam in a desired direction, on a refractive index distribution for correcting aberration in the first lens and the second lens.

8. The wavelength domain optical switch according to claim 4, wherein the first reflective optical phase modulator is controlled to a refractive index distribution obtained by superimposing a saw-shaped refractive index distribution for polarizing an input light beam in a desired direction, on a refractive index distribution for correcting aberration in the first lens and the second lens.

\* \* \* \* \*